United States Patent Office 3,450,967
Patented June 17, 1969

3,450,967

SELENIUM MEMORY CELL CONTAINING SILVER UP TO 2 ATOMIC PERCENT ADJACENT THE RECTIFYING CONTACT

Vitautas Balio Tolutis, Lenin Square, 9, Apt. 30, Vilnyus, U.S.S.R.

Continuation-in-part of application Ser. No. 295,885, July 18, 1963. This application Sept. 7, 1966, Ser. No. 577,766
Int. Cl. H01l 3/02, 9/02, 9/08
U.S. Cl. 317—241 3 Claims

ABSTRACT OF THE DISCLOSURE

A semiconductor memory cell consisting of a selenium rectifier, in which the selenium in the region of a rectify- and silver until a layer having a pre-set thickness is ob- method of manufacturing said memory cell, wherein (1) onto the layer of a material that forms, in conjunction with selenium, an ohmic contact is simultaneously deposited by the vacuum sputtering technique selenium and silver until a layer having a pre-set thickness is obtained, followed by recrystallizing said layer and depositing thereonto the layer of a material that forms, in conjunction with the selenium, a rectifying contact, or (2) onto the layer of a material that forms, in conjunction with selenium, an ohmic contact is deposited by the vacuum sputtering technique a selenium layer, followed by recrystallizing said selenium layer, applying thereonto a thin layer of silver-doped selenium, and depositing the layer of a material that forms, in conjunction with the selenium, a rectifying contact.

The present invention relates to computers and automation.

This application is a continuation-in-part of application Ser. No. 295,885, filed July 18, 1963, by the same applicant as the present application.

In most cases memory cells are three-dimensional discrete elements, for instance, ferrite elements, and hence cannot be used in microminiature film or hybrid circuits. The known two-dimensional film memory cells, for instance, comprising thin ferromagnetic films, develop substantial disturbances in the useful signal which is weak and has to be amplified. The useful or read-off signal has to be amplified in almost all known memory cells, this being their principal disadvantage. Another major shortcoming of the known memory elements is the poor flexibility of their characteristics, limiting the range of their application in computers. Inability to be used in a wide variety of functions is also a serious shortcoming of the known memory cells.

The present invention is aimed at designing a new miniature film semiconductor memory cell which possesses versatility enabling the same cell to be used under various conditions either as a memory cell with information slowly destroying during read-off, i.e. requiring no frequent regeneration of the information recorded, and as a commutating or integrating element with controllable commutation and integration parameters, so that it possesses a higher useful specific power, is reliable in operation and indifferent to accidental large overloads.

To provide such an element numerous experiments were conducted with the following results:

(1) Silver added to hexagonal polycrystalline selenium serves as a donor producing deep energy levels in selenium;

(2) Silver is distributed uniformly in selenium, being concentrated on the surface or in structural macrodefects of selenium crystals;

(3) Under the effect of strong electric fields silver addition displays high drift mobility, which largely depends on the intensity of the electric field;

(4) Silver ions drift across the surface or along macrodefects of the selenium crystalline structure.

These facts have permitted to establish a possibility of designing a selenium film memory cell, whose voltampere characteristic can be varied by means of short current pulses (applied voltage) of definite polarity and value. The rate at which the parameters of the voltampere characteristics are changed depends to a very considerable extent on the value of applied voltage (intensity of current flow through the cell). These changes can easily be reversed. For this reason the element can assume two extreme states, in one of which it has the voltampere characteristic of a selenium rectifier, and in the other there is almost no irregularity of conductivity. These two states are designated with symbols "0" and "1."

In addition to these two extreme states, the cell can acquire a plurality of intermediate states.

To better understand the idea of the invention and its efficiency it is below described with reference to the drawings in which.

Figure 1:
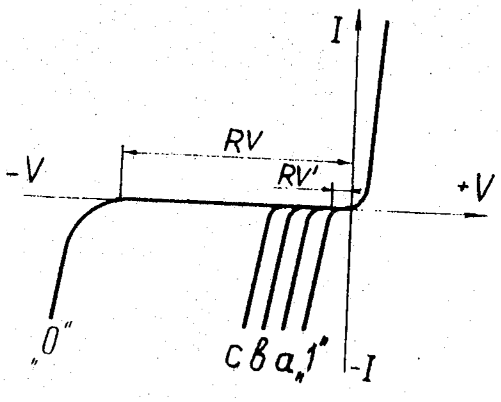
FIGURE 1 shows the principal voltampere characteristics of the memory cell in stable states 0 and 1 and in intermediate *a*, *b*, *c* after a series of pulses has been applied, with duration $t_a$, $t_b$, $t_c$ less than the relaxation time (commutation time) $\tau$.

The operation of this memory cell is based on variations caused in the parameters of the voltampere and volt-capacitive characteristics of the rectifying contact due to changes in the distribution of the addition silver centres in the selenium blocking layer under the effect of external voltage applied to the element. Under the effect of even a weak external voltage the blocking layer of the rectifying contact produces a strong electric field causing electro-diffusion of silver ions in selenium in the region of the rectifying contact. Depending on the polarity of the voltage applied, silver concentration in the blocking layer either increases or decreases. With a given external voltage applied for a certain time $\tau$ (commutation time) a definite balanced distribution of silver is observed in the blocking layer, i.e. the element acquires a certain stable state. If the time during which external voltage is applied is less than $\tau$, each pulse causes the memory cell to acquire a new intermediate state (*a*, *b*, *c*, etc.), i.e. the cell gradually passes from the state 1 to state 0, or reverse (FIGURE 1). In this manner the cell performs integrating functions. The relaxation time $\tau$ largely depends on the value of external voltage applied: it rapidly rises in response to voltage decrease. Owing to this particular fact it is possible to read off the information recorded without noticeably destroying it. With the element in state "1" or "0," i.e. when high voltage is applied to the memory cell, the latter rapidly changes its state, but when the information is read off with lower voltage applied, the state of the cell changes $10^7$ to $10^8$ times slower. Changes in the duration of "1" or "0" cause changes in $\tau$ through several orders. This fact makes it possible to vary over a wide range the destruction rate of the information read off, and also to vary integration parameters. The state of the memory cell is suitably determined from the parameters of its voltampere and volt-capacitive characteristics, for instance, resistance in the reverse direction at a given voltage (supplied as a short pulse), which is considerably less than the voltage applied to put the cell in a given state. As information "1" is repeatedly read off, the signal level tends to reduce gradually, that is, the information is gradually erased. For "0," the information read-off practically does not change the signal level. The information stored destroys spontaneously during different time periods: for 0 the information can be preserved for many weeks at room temperature, while for 1 it remains readable for a few days only.

The semiconductor memory cell has a crystalline selenium layer. On the opposite sides of said selenium layer provision is made for layers of materials, wherein one layer forms, in conjunction with selenium, a rectifying contact, while the other layer yields an ohmic contact. The selenium layer side that forms with the adjoining material a rectifying contact contains 0.05–2 at. percent of silver.

To manufacture the present memory cell, recourse is had to essentially the following process:

The substrate used to manufacture the present memory cell may consist of a metal, dielectric, or semiconductor surface.

The ohmic contact is formed by a selenium-to-bismuth, or -nickel, or -bismuth selenide, or -nickel selenide pair. The layers of bismuth, nickel, bismuth selenide, or nickel selenide may be obtained by the vacuum sputtering technique or by some other known process, e.g. by electrodeposition. The procedure employed for manufacturing the present memory cell having a dielectric or semiconductor substrate comprises depositing onto the substrate by the vacuum evaporation technique the layer of a metal noted for its good adhesion to the substrate material, e.g. an aluminum layer, followed by coating the aforesaid metal layer with the layer of a material which, in conjunction with selenium, forms an ohmic contact.

The selenium layer consists of crystalline selenium doped with silver and is prepared by simultaneously applying selenium and silver by the vacuum sputtering technique onto a substrate heated to a temperature of 50–60° C. and preliminarily coated with the layer of a material which, in conjunction with selenium, forms an ohmic contact, followed by recrystallizing the selenium at a temperature of 200° C. for a period of 30–60 minutes. The thickness of the selenium layer should be not less than 10$\mu$, the concentration of silver being at least 0.05 at. percent.

The rectifying contact is formed by a selenium-to-calcium or- cadmium-tin alloy, or- aluminum, or- cadmium sulfide, or- cadmium selenide pair. Beneficial results are obtained with a cadmium layer vacuum sputtered on the crystalline selenium layer and coated with a layer of tin or aluminum.

| | |
|---|---|
| Optimum thickness of cadmium layer | 1–2$\mu$ |
| Tin or aluminum layer thickness | 1–3$\mu$ |

In all instances, the process of manufacturing the present memory cell remains essentially the same, insofar as it involves doping with silver the selenium layer region that contacts the layer of a material and forms with said material a pair serving as a rectifying contact. To manufacture the present memory cell, recourse may be had to a number of modifications of the present method:

(1) Onto a substrate coated with the layer of a material that forms, in conjunction with selenium, an ohmic contact is applied a silver-doped selenium layer, and the latter layer, on being subjected to recrystallization, is then coated with the layer of a material that yields, in conjunction with the selenium layer, a rectifying contact.

(2) Onto a substrate coated with the layer of a material that forms, in conjunction with selenium, an ohmic contact is applied a selenium layer at least 10$\mu$ thick, followed by subjecting the selenium layer to two-stage crystallization, first at a temperature of 110–120° C. for a period of 30 minutes, and then at a temperature of 200–214° C. for a period of one hour, and thereafter depositing a layer of doped selenium 2–3$\mu$ thick, crystallizing said layer at a temperature of 200° C. for a period of one hour, and thereafter applying the layer of a material that forms, in conjunction with selenium, a rectifying contact.

(3) A procedure which differs from that disclosed in (2) in that onto the layer of non-doped crystalline selenium is applied a thin (0.05–0.2$\mu$) layer of silver selenide, followed by depositing the layer of a material that forms, in conjunction with selenium, a rectifying contact.

Presented hereinbelow, by way of example, is the description of a specific method for the manufacture of a memory cell having a semiconductor substrate.

Using a stencil repeating the configuration of the cell and current lead an aluminium layer up to 1 micron thick is deposited by spraying on the surface of the monocrystal under elevated temperature in high vacuum. The last decimal fractions are sprayed with a mixture of aluminum and bismuth. Finally, when the aluminium layer has been made, the bismuth layer is brought to the thickness of 0.5 micron under the same conditions in vacuum. The substrate temperature on the monocrystal surface should range during this process from 120 to 150° C. The finished surface should have a slightly dull look.

After bismuth has been pulverised, a 5–7 micron layer of pure (unalloyed) aluminium is sprayed under the same vacuum conditions, but the temperature of the crystal has to be maintained at 50° C. Crystalllization of the selenium layer is conducted in the air and involves two consecutive crystallization steps, the first step being carried out at 110–120° C. for 30 minutes, and the second step at 200–214° C. for one hour.

Under the same conditions the selenium layer is covered with an admixture of selenium and silver, to the thickness of 2–3 microns. For this purpose selenium and silver are simultaneously evaporated from different evaporators. Depending on the properties to be obtained in the cell, silver concentration is generally varied from several fractions to several percent. The higher the silver concentration, the larger the commutation time $\tau$ of the cell is, the more stable the states 1 and 0. Depending on the concentration of silver, $\tau$ can vary from several microseconds to milliseconds, and the number of information readings from several dozen to $10^7$–$10^9$ or more.

After the layer has been built up it is subjected to crystallization at 200° C. for 20 to 30 minutes. The upper rectifying contact comprises a layer of cadmium alloyed with tin which is also built up by pulverisation under elevated temperatures in vacuum. The cadmium layer is superposed with a thick tin layer, cadmium having thickness of 0.5–1 micron and tin 1 to 3 microns. Thermal pulverisation is again used in conjunction with suitable stencils to connect the upper cell electrode with the respective elements of the film or solid circuit.

The shape of the cell and stencils is selected to satisfy the requirements of particular circuits, which can be, for instance, micro-circuit elements (film-based or hybrid) incorporating the memory cell amongst a plurality of other circuit elements, or matrixes comprising memory cells.

The examples considered below should not be understood as limiting the scope of the present invention, in which variations may occur without departing from the idea and aims of the invention.

EXAMPLE 1

Figure 2:
FIGURE 2 shows an oscillograph of the voltampere characteristic of the memory cell in the state "0."

An oscillograph of the voltampere characteristic of the memory cell is obtained in state 0 (FIG. 2) at 50 c.p.s. 40 v. This state was achieved by a 100 v. 1 microsecond pulse in reverse polarity.

EXAMPLE 2

Figure 3:
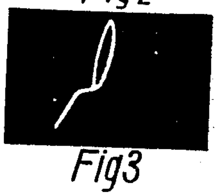
FIGURE 3 shows an oscillograph of the voltampere characteristic of the memory cell in the state "1."

The oscillograph of the voltampere characteristic shown in FIG. 3 was obtained in the memory cell in state 1 at 50 c.p.s. 8 v. This state was achieved by a 50 v. 0.1 microsecond pulse in forward polarity.

The present memory cell is suitable for application in computers and automatic devices. More particularly, the present cell can be used in long-term memory devices, logical elements, pulse counters, shift registers, etc., as a memory or integrating element.

Figure 4:
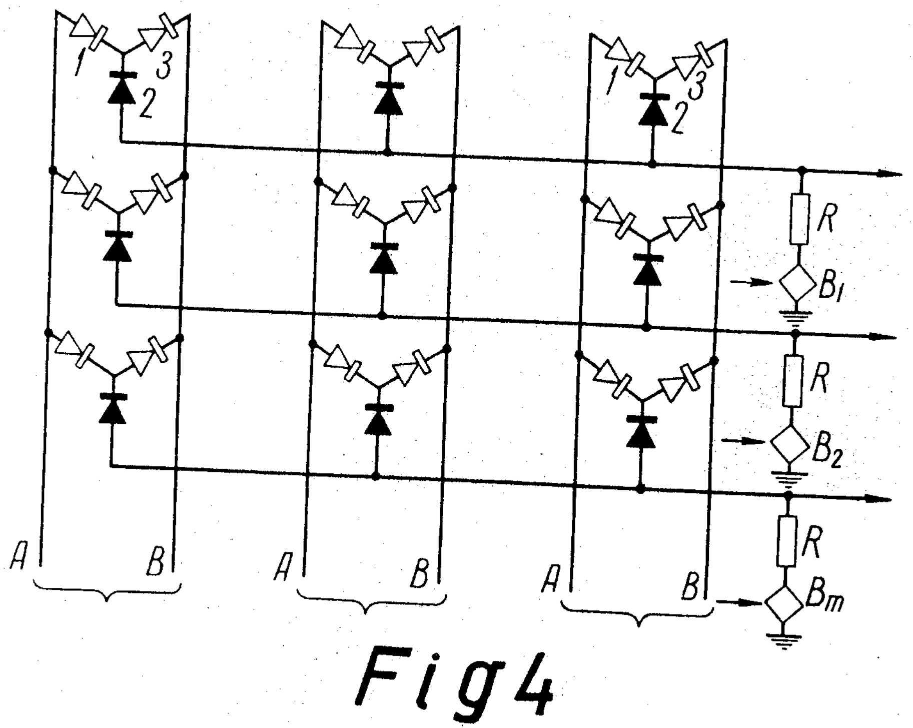
FIGURE 4 shows the principal diagram of the durable memory unit comprising the cell under the present application.

Referring to FIG. 4 showing a long-term memory device, memory cells 2 are connected in tandem with diodes 1. In state 1 a negative voltage pulse is supplied to one of the busbars A, B. Forward currents flow through open valves $B_1$, $B_2$ . . . $B_m$, discharge busbars, diodes 3 and cells 2 and transfer the respective memory cells to state 1. To achieve state 0 a positive voltage pulse is fed to one of the busbars A and reverse current flow through respective open valves $B_1$, $B_2$ . . . $B_m$, discharge busbars, didiodes 1 and cells 2 transfers the respective memory cells to state 0. Common semiconductor diodes 1, 3 and memory cells 2 are star connected. When open, memory cells 2 connect diodes 1, 3 to the busbars A, B, but when closed they deenergise the diodes. Positive polarity read-off pulses are supplied to one of the busbars A, the voltage appearing at the input resistors being assumed to be 1 or 0 signal.

Figures 5, 6:
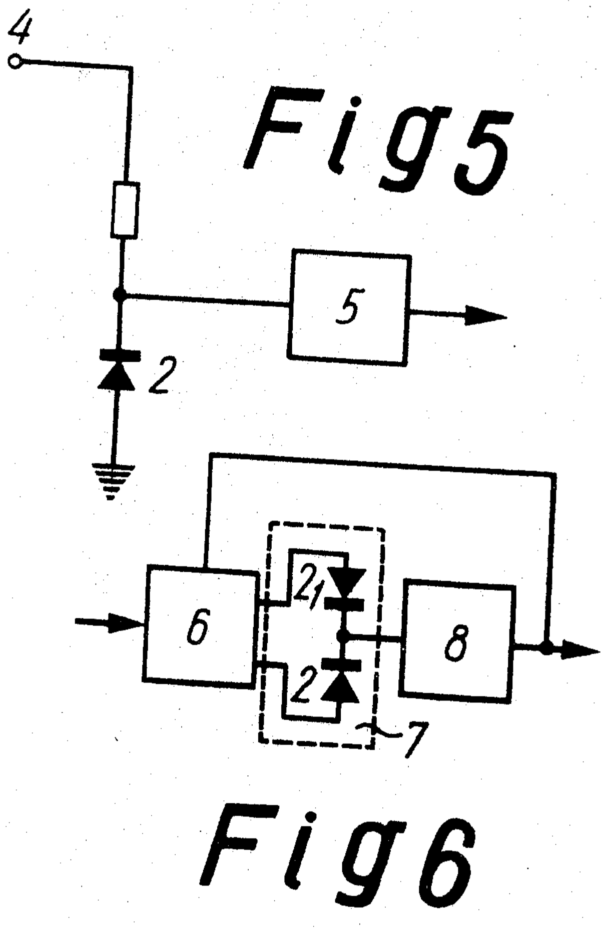
FIGURE 5 shows the principal diagram of the pulse integrator comprising the semiconductor memory cell.
FIGURE 6 shows the principal diagram of the pulse counter, in which the memory cell is used as a storage element.

FIGURE 5 shows a pulse integrator, in which semiconductor memory cell 1 is transferred to state 1 when a negative pulse is fed to circuit input 4. Then the input is supplied with positive pulses to be integrated, and each pulse causes the resistance of cell 2 to rise and voltage drop across it to increase. As soon as the voltage drop reaches the predetermined level, it causes actuation of the triggered blocking generator 5, the output of which issues a signal. Integration is also feasible in the direction from state 0 to state 1.

A pulse counter shown in FIG. 6 comprises a commutator 6, a storage element 7, a triggered blocking generator. Initially cell 2 is in state 1 and cell $\mathbf{2}_1$ in state 0. In response to positive pulses supplied to the input, the characteristic of cell $\mathbf{2}_1$ tends to state 1, and the characteristic of cell 2 to state 0. Due to distribution of the voltage drop the voltage across cell 2 increases. When it reaches a definite point, or count starting point, triggered blocking generator 8 is actuated and supplies a pulse to the input of the second stage (not shown in FIG. 6) of the counter and switches the circuit of commutator 6 so as to deliver the input pulses to cell 2, whose characteristic tends to 1, the characteristic of cell $\mathbf{2}_1$ at this time tending to 0. A pulse produced in the blocking generator returns the commutator circuit to the initial state.

Figure 7:
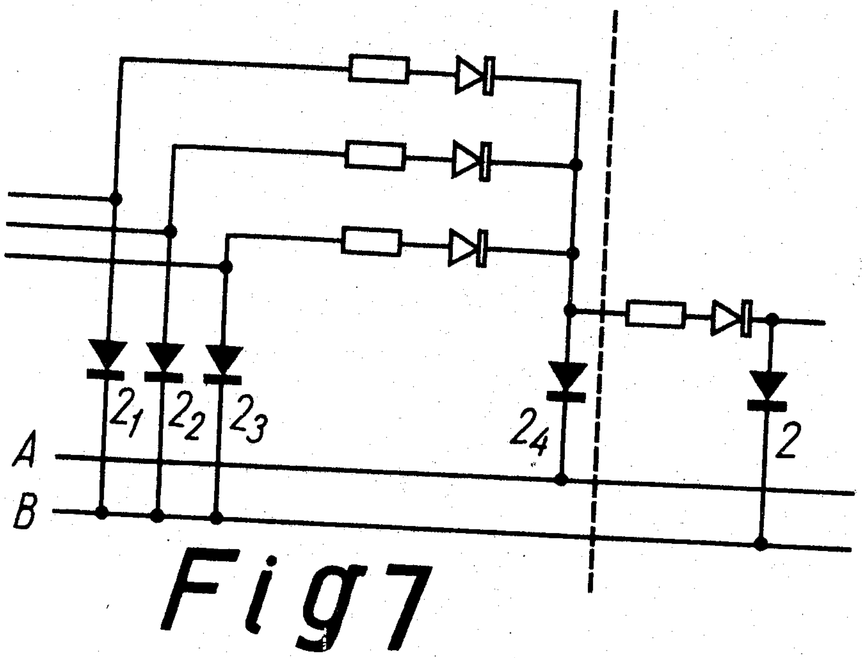
FIGURE 7 shows the principal logical OR circuit and its connection to the shift register comprising the present cell.

Logical OR circuit (FIG. 7). If at least one of the cells $\mathbf{2}_1$, $\mathbf{2}_2$, $\mathbf{2}_3$ is in state 1, a positive setting pulse directed to the busbar B with respect to A causes a small voltage drop across the cell and state 1 is recorded in cell $\mathbf{2}_4$, the cell recording state 1 being transferred to state 0.

Figure 8:
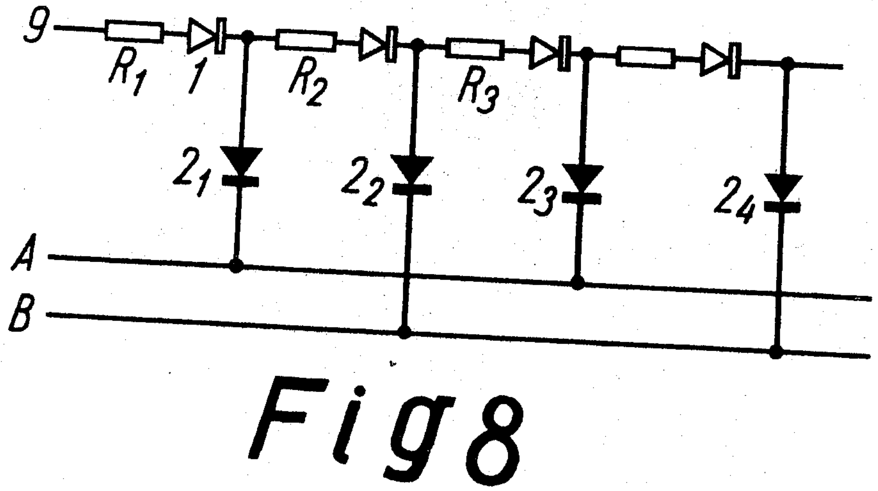
FIGURE 8 shows the principal diagram of a two-way shift register comprising a semiconductor memory cell.

FIGURE 8 illustrates a two-way shift register, in which in initial state all memory cells are in state 0. When a positive pulse is directed to register input 9 with respect to the busbar A, cell $\mathbf{2}_1$ changes its state to state 1. The unit cannot be recorded in the other memory cells because of resistors R2, R3, etc. When a positive pulse is fed to the busbar A with respect to B, forward voltage drops across cell $\mathbf{2}_2$ and switches it into state 1, cell $\mathbf{2}_1$ being shifted to state 0 under the effect of reverse voltage. Diode D1 is employed to prevent reverse information. The next pulse causes a positive setting pulse to appear on the busbar B with respect to the busbar A, the state 1 being removed from cell $\mathbf{2}_2$ and recorded in cell $\mathbf{2}_3$.

By virtue of this invention the following novel effect is achieved:

(1) The present film memory cell is a general purpose element, since depending on the operating conditions the same cell can be utilised as (1) a permanent memory cell; (2) a commutating element with predetermined parameters of commutation characteristics (commutation time, read-off signal amplitude), or (3) an integrating element with predetermined integration parameters.

(2) During information read-off the cell can develop a large useful power up to 0.5 watt per 1 sq. mm. in pulse regime (with voltage amplitude up to 150 v.). The minimum specific power required to read off information is of the lowest possible value (less than 1 microwatt per 1 sq. mm.).

(3) The principles of cell manufacture allow the main parameters to be varied over a wide range:

(a) cell commutation time can be varied from fractions of a microsecond to a few hours;

(b) the voltage amplitude which shifts the cell from one extreme state to the other, for instance from 1 to 0, can be varied from several volts to 120 v.

(4) Owing to the specific principles of manufacture the present cell can be included in film and hybrid circuits, or assembled into matrixes used, for instance, in memory devices, or for other purposes. The compactness of the cells in a matrix is practically unlimited.

(5) The cell does not respond to repeated heave overloads and is highly reliable in operation.

(6) The element is insensitive to intense nuclear radiation.

(7) The ratio of the read-off signal voltage amplitude to the maximum noise amplitude is $10^4$ and more in the present cell, and its highest specific power is 0.5 watt per sq. mm. Therefore, no intermediate amplification is required in devices employing the present cell.

(8) The versatility of the present cell substantially simplifies the construction of various circuits in electronic digital computers and automatic devices.

(9) The manufacture of the present cell and a matrix on the basis thereof is quite simple and can be fully automated.

(10) Manufacturing costs are low.

What I claim is:

1. A semiconductor memory cell comprising a crystalline selenium layer; a layer of a material disposed on one side of said selenium layer and forming therewith an ohmic contact; a layer of another material disposed on the opposite side of said selenium layer and forming therewith a rectifying contact; and a selenium layer doped with silver to the extent of 0.05–2 at. percent, said silver-doped selenium layer being disposed in the region that adjoins said rectifying contact.

2. A method of manufacturing a semiconductor memory cell wherein onto a layer heated to 50–60° C. and consisting of a material that forms, in conjunction with selenium, an ohmic contact is simultaneously deposited by the vacuum sputtering technique selenium and silver at a deposition rate of 200–300 A. and 0.1–1 A. per second, respectively, until there is obtained a silver-doped selenium layer having an overall thickness of at least 10$\mu$, followed by recrystallizing said selenium layer at 200–214° C. for 1 hour, and thereafter depositing thereonto the layer of a material that forms, in conjunction with the selenium, a rectifying contact.

3. A method of manufacturing a semiconductor memory cell, wherein onto a layer heated to 50–60° C. and consisting of a material that forms, in conjunction with selenium, an ohmic contact is deposited by the vacuum sputtering technique selenium at a deposition rate of 200–300 A. per sec. until there is obtained a selenium layer at least 10μ thick, followed by subjecting the deposited selenium to two-step recrystallization, first by heating at 110–120° C. for 30 minutes and then at 200–214° C. for 1 hour, and thereafter simultaneously depositing on said selenium layer by the vacuum sputtering technique selenium and silver at a deposition rate of 200–300 A. and 0.1–1 A. per sec., respectively, until there is obtained a silver-doped selenium layer having an overall thickness of at least 2–3μ, recrystallizing said silver-doped selenium layer at 200–214° C. for 1 hour, and then depositing thereonto the layer of a material that forms, in conjunction with the selenium, a rectifying contact.

References Cited

UNITED STATES PATENTS 3,130,137 4/1964 Araki ---------------- 204—43

JOHN W. HUCKERT, *Primary Examiner.*

U.S. Cl. X.R.

148—1.5; 307—218, 220, 221; 317—234